United States Patent
Hannah

Patent Number: 5,903,774
Date of Patent: May 11, 1999

[54] EXTERNAL NETWORK NETWORK INTERFACE DEVICE WITHOUT INTERIM STORAGE CONNECTED TO HIGH-SPEED SERIAL BUS WITH LOW LATENCY AND HIGH TRANSMISSION RATE

[75] Inventor: Eric C. Hannah, Pebble Beach, Calif.

[73] Assignee: Intel Corporation, Santa Clara, Calif.

[21] Appl. No.: 08/624,999

[22] Filed: Mar. 29, 1996

Related U.S. Application Data

[60] Provisional application No. 60/006,431, Nov. 13, 1995, provisional application No. 60/011,320, Feb. 8, 1996, and provisional application No. 60/013,302, Mar. 8, 1996.

[51] Int. Cl.⁶ .................................................... G06F 13/40
[52] U.S. Cl. ............................................ 395/849; 395/880
[58] Field of Search .................................. 370/276, 352, 370/419, 423, 60.1, 100.1; 395/182.02, 250, 304, 446, 200.8, 200.66, 750.04, 275, 849, 880; 348/7

[56] References Cited

U.S. PATENT DOCUMENTS

| | | | |
|---|---|---|---|
| 3,795,773 | 3/1974 | Konig et al. | 379/230 |
| 4,344,132 | 8/1982 | Dixon et al. | 395/250 |
| 5,081,624 | 1/1992 | Beukema | 395/182.02 |
| 5,168,492 | 12/1992 | Beshai et al. | 370/60.1 |
| 5,170,470 | 12/1992 | Pindar et al. | 395/275 |
| 5,241,543 | 8/1993 | Amada et al. | 370/100.1 |
| 5,400,340 | 3/1995 | Hillman et al. | 370/419 |
| 5,412,782 | 5/1995 | Hausman et al. | 395/200.8 |
| 5,450,411 | 9/1995 | Heil | 370/352 |
| 5,499,239 | 3/1996 | Munter | 370/60.1 |
| 5,519,693 | 5/1996 | Galuszka et al. | 370/276 |
| 5,544,315 | 8/1996 | Lehfeldt et al. | 395/200.66 |
| 5,579,503 | 11/1996 | Osborne | 395/446 |
| 5,606,359 | 2/1997 | Youden et al. | 348/7 |
| 5,608,884 | 3/1997 | Potter | 395/304 |
| 5,652,895 | 7/1997 | Poisner | 395/750.04 |

OTHER PUBLICATIONS

IEEE Draft Standard for a High Performance Serial Bus. P1394, D8.0v2, Jul. 1995, DS3285. Institute of Electrical and Electronics Engineers, Inc.

*Primary Examiner*—Thomas C. Lee
*Assistant Examiner*—Chien Yuan
*Attorney, Agent, or Firm*—William H. Murray; N. Stephan Kinsella

[57] ABSTRACT

A network interface for coupling a computer node to a network has a physical interface which is coupleable to the network for coupling the network interface to the network. The network interface is coupleable to the computer node through a high-speed serial bus which has a latency and a signal transmission rate sufficient to enable transmission of signals between the network and the computer node without interim storage of the signals in a buffer on the network interface. In a preferred embodiment, the computer node has a processor capable of processing network protocols and the signals may be transmitted between the network and the computer node without processing of the network protocols by a processor on the network interface.

21 Claims, 4 Drawing Sheets

EXTERNAL NETWORK NETWORK INTERFACE DEVICE WITHOUT INTERIM STORAGE CONNECTED TO HIGH-SPEED SERIAL BUS WITH LOW LATENCY AND HIGH TRANSMISSION RATE

CROSS-REFERENCES TO RELATED APPLICATIONS

This non-provisional U.S. national application, filed under 35 U.S.C. §111(a) claims, under 35 U.S.C. §119(e)(1), the benefit of the filing date of provisional U.S. applications Nos. 60/006,431, filed under 35 U.S.C. §111(b) on Nov. 13, 1995; 60/011,320, filed under 35 U.S.C. §111(b) on Feb. 8, 1996; and (60/013,302), filed under 35 U.S.C. §111(b) on Mar. 8, 1996 as attorney docket no. 366431-122P3, the teachings of all three being incorporated herein by reference.

BACKGROUND OF THE INVENTION

1. Field of the Invention

This invention relates to the field of devices for coupling computer nodes to a network.

2. Description of the Related Art

Network interface cards (NICs) are devices that allow proper interfacing and coupling of computer nodes to networks, such as local area networks (LANs) and wide area networks (WANs), Current network technology includes fiber distributed data interface (FDDI), two 100 Megabit per second (Mbps) Ethernet variants and Asynchronous Transfer Mode (ATM).

One characteristic of these and next generation network technologies is the high bandwidth available. The aggregate (transmit & receive) physical layer rates for these networks are summarized in Table 1 below:

TABLE 1

| NETWORK TYPE | AGGREGATE PHYSICAL LAYER BANDWIDTH | |
| --- | --- | --- |
| FDDI | 100 | Mbps |
| Fast Ethernet | 100 | Mbps |
| 100 VG-AnyLAN | 100 | Mbps |
| 25 Mbps ATM | 50 | Mbps |
| OC3c ATM | 310 | Mbps |
| OC-12c ATM | 1.244 | Gbps |

A NIC typically is a removable component of the input/output (I/O) subsystem of a computer node and provides connectivity between the network and the computer node. An NIC generally has specialized hardware necessary to physically attach to the network and logic components for electronically interfacing the NIC to the computer node.

FIG. 1 shows a typical network 11 coupling a host computer 10 with computer nodes 12–15. Each of the computer nodes is coupled to network 11 through conventional bus 17 and an NIC 20.

FIG. 2 shows the architecture of a typical, conventional NIC 20 designed for interfacing with a high performance network, such as one of those identified in Table 1. NIC 20 has physical interface 21 which includes the hardware needed for making a physical connection to network 11. Typically, physical interface 21 further provides the lowest level data framing and regulates media access in shared media networks.

Protocol engine 22 processes network protocols. The specifics of protocol engine 22 vary significantly depending on the particular network technology. Typically, protocol engine 22 performs one or more of header processing, header formatting and cell segmentation and reassembly. Local memory 23 and microcontroller 24 also might be used to assist with protocol processing.

Local memory 23 and microcontroller 24 also provide arbitration functions, for example, to prevent collisions between signals being transmitted and received by NIC 20. As part of its arbitration function, microcontroller 24 will, when necessary, withhold signal transmission until a line is clear for making such transmission. Microcontroller 24, in conjunction with local memory 23, also reconstructs fragmented signal packets.

Direct memory access (DMA) engine 25 is provided to move data between memory buffers 28 of computer node 12 and receive (Rx) and transmit (Tx) data buffers 26 and 27, respectively. DMA engine 25 typically is managed by microcontroller 24 and local memory 23. Local memory 23 also can be used to temporarily store signals received from network 11 until bus 17 can be acquired for transmitting the signals to computer node 12.

Data transfers from a computer node, such as node 12, through bus 17 are initiated by an NIC device driver 29. Typically, NIC 20 is provided with a pointer to a queue of buffer descriptors which identify memory buffers 28 holding protocol data units (PDUs) that are ready to be transmitted. DMA engine 25 reads memory buffers 28 in the node 12 holding the PDUs, which are subsequently transmitted to network 11. When memory buffers 28 have been completely read, the buffer descriptors are returned to device driver 29 for reuse.

Transfer of data from network 11 to node 12 follows a similar procedure. NIC device driver 29 allocates a pool of buffer space in the memory buffers 28 and provides a pointer identifying the queue of buffer descriptors controlling the buffers to NIC 20. As data is received from the network, it is transferred from NIC 20 to the node memory buffers 28 which have been provided. When a PDU has been completely received and stored in node memory buffers 28, NIC 20 returns the buffer descriptor to the device driver 29.

SUMMARY OF THE INVENTION

Briefly, in accordance with one embodiment of the invention, a network interface for coupling a computer node to a network has a physical interface which is coupleable to the network for coupling the network interface to the network. The network interface is coupleable to the computer node through a high-speed serial bus which has a latency and a signal transmission rate (bandwidth) sufficient to enable transmission of signals between the network and the computer node without interim storage of the signals in a buffer inside the network interface. In a preferred embodiment, the computer node has a processor capable of processing network protocols and the signals may be transmitted between the network and the computer node without processing of the network protocols by a processor in the network interface.

BRIEF DESCRIPTION OF THE DRAWINGS

The following detailed description will be more fully understood with reference to the accompanying drawings in which.

DETAILED DESCRIPTION OF A PREFERRED EMBODIMENT

Figure 3:
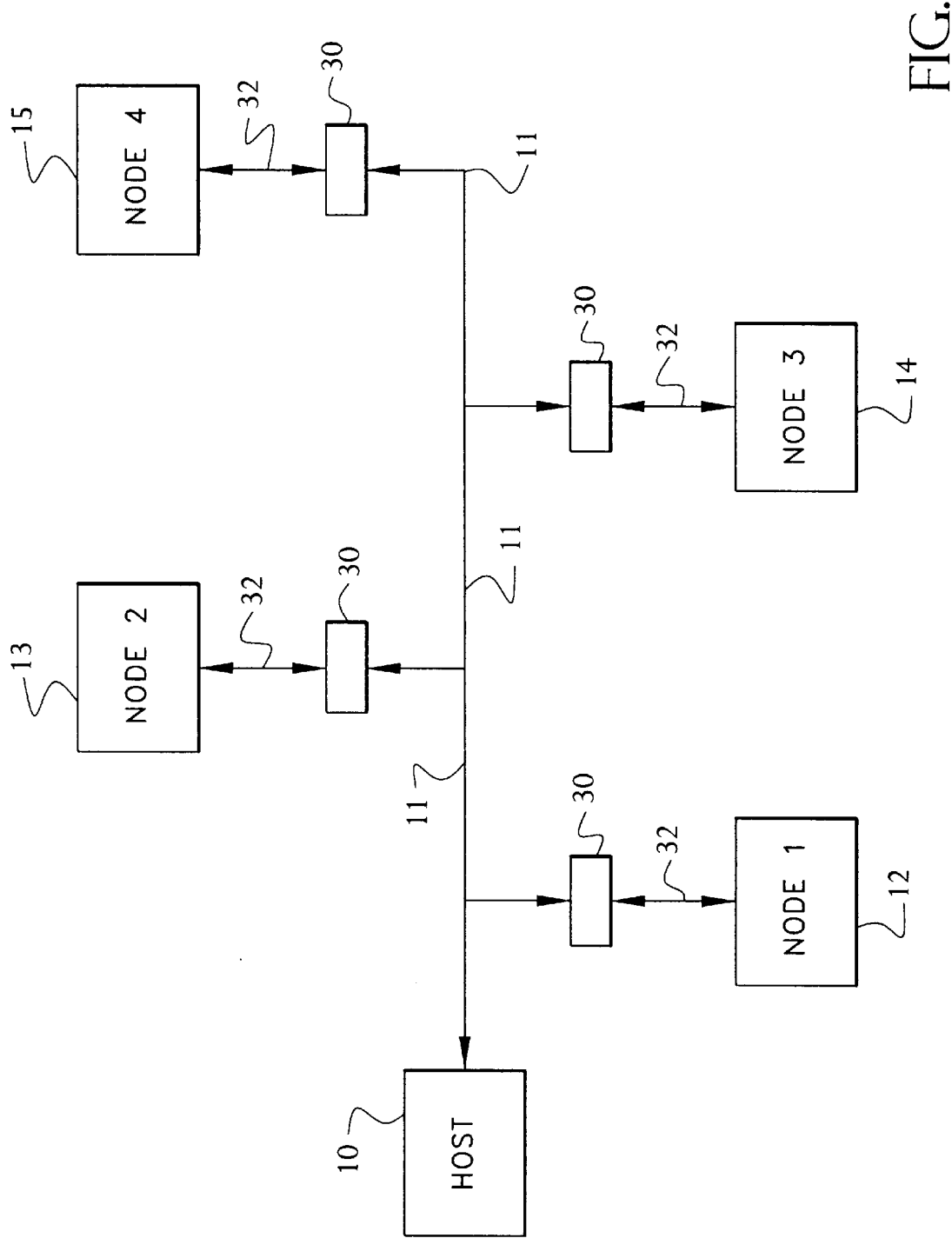
FIG. 3 is a block diagram of the computer network of the invention.
Figure 4:
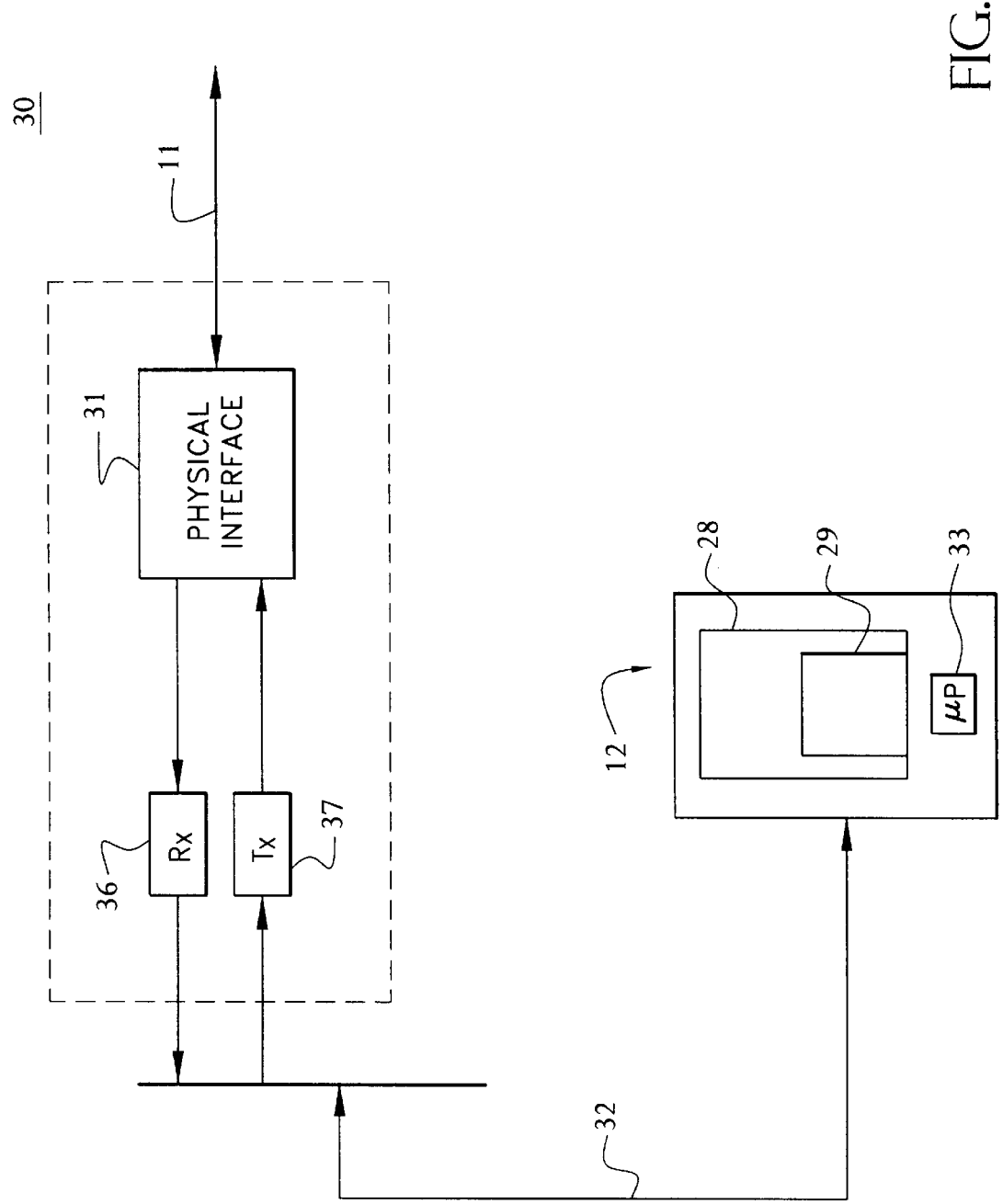
FIG. 4 is a block diagram of a network interface of the invention.

Referring to FIGS. 3 and 4, a substantial cost reduction in network interface devices is possible through the use of a high-speed serial bus, such as bus 32, which provides low latency and high bandwidth. A bus of this type is disclosed in U.S. Provisional applications Nos. 60/006,431, filed on Nov. 10, 1995; 60/011,320, filed on Feb. 8, 1996; and (60/013032), filed on Mar. 8, 1996 as attorney docket no. 366431-122P3, the teachings of all three being incorporated herein by reference.

NIC 30 has physical interface 31 which includes the hardware needed for making a physical connection to a network, such as network 11. Network 11 can be a conventional network or a later generation, high bandwidth network such as one of those listed in Table 1, above. NIC 30 has receive and transmit buffers 36 and 37, respectively, for temporarily holding data being transferred between a computer memory, such as memory 28 of node 12 and network 11. However, for reasons further explained below, receive and transmit buffers 36 and 37 can have significantly less data storage capacity than conventional NIC buffers, such as receive and transmit buffers 26 and 27 of conventional NIC 20. In an embodiment, receive and transmit buffers 36 and 37 are eliminated entirely from NIC 30.

NIC 30 is coupled to computer node 12 by high speed bus 32. Bus 32 permits high-speed digital signal transfer between NIC 30 and computer node 12, e.g., at a rate of around 800 Megabits per second (Mbits/sec). Bus 32 further has a low latency, thereby enabling substantially immediate access of bus 32 by either of computer node 12 or network 11 for rapid exchange of data and further has an ability to directly access memory 28 in computer node 12. Furthermore, bus 32 tolerates fine-grain multiplexing and provides isochronous bandwidth allocation, thereby providing for periodic transmission of selected signals at fixed intervals. The combined features of bus 32 substantially permit real-time data transfer between computer node 12 and network 11. As will be understood by one having ordinary skill in the art, such real-time signal transfer permits processing in real time of any transmitted signals by processor 33 of computer node 12.

Prior NICs, such as NIC 20, require significant buffer space, such as receive buffer 26, to hold signals received from the network until bus 17 can be acquired for transmitting them to a computer node, such as computer node 12. Furthermore, the relatively low bandwidth of conventional bus 17 prevents a complete signal packet from being transmitted in real time to conventional NIC 20 for transmission to network 11, necessitating a large transmit buffer 27 in which embedded controller 24 can reassemble the signal as it is received from bus 17. Bus 32, having a relatively high bandwidth and guaranteed low latency, can transmit digital signals essentially at a real time rate, i.e., immediately upon receipt by NIC 30 or upon issuance by computer node 12. Therefore, receive and transmit buffers 36 and 37, respectively, can be eliminated or are reduced in size with respect to receive and transmit buffers 26 and 27, and signals can be delivered directly to or from computer node 12 from or to network 11.

DMA engine 25 of conventional network interface device 20 primarily is used to move data between receive and transmit buffers 26 and 27 and memory on a computer node, such as memory 28. Whereas network interface card 30 can be constructed without, or with greatly reduced transmit and receive buffers, such as buffers 36 and 37, no need exists for including a DMA engine in NIC 30, substantially reducing the hardware cost of such device. Furthermore, bus 32 can provide the DMA capabilities for directly accessing node memory 28.

Figure 1:
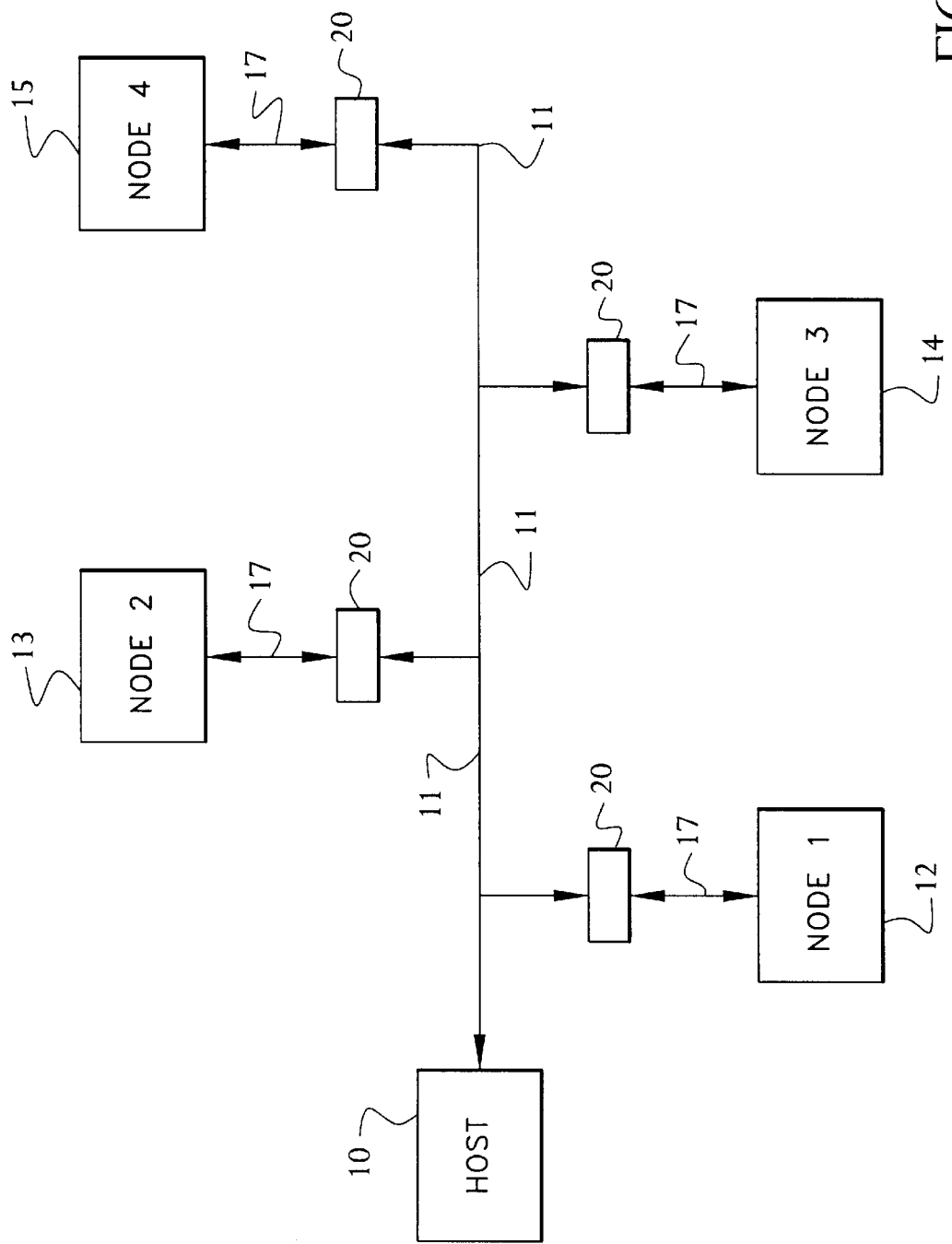
FIG. 1 is a block diagram of a typical computer network.
Figure 2:
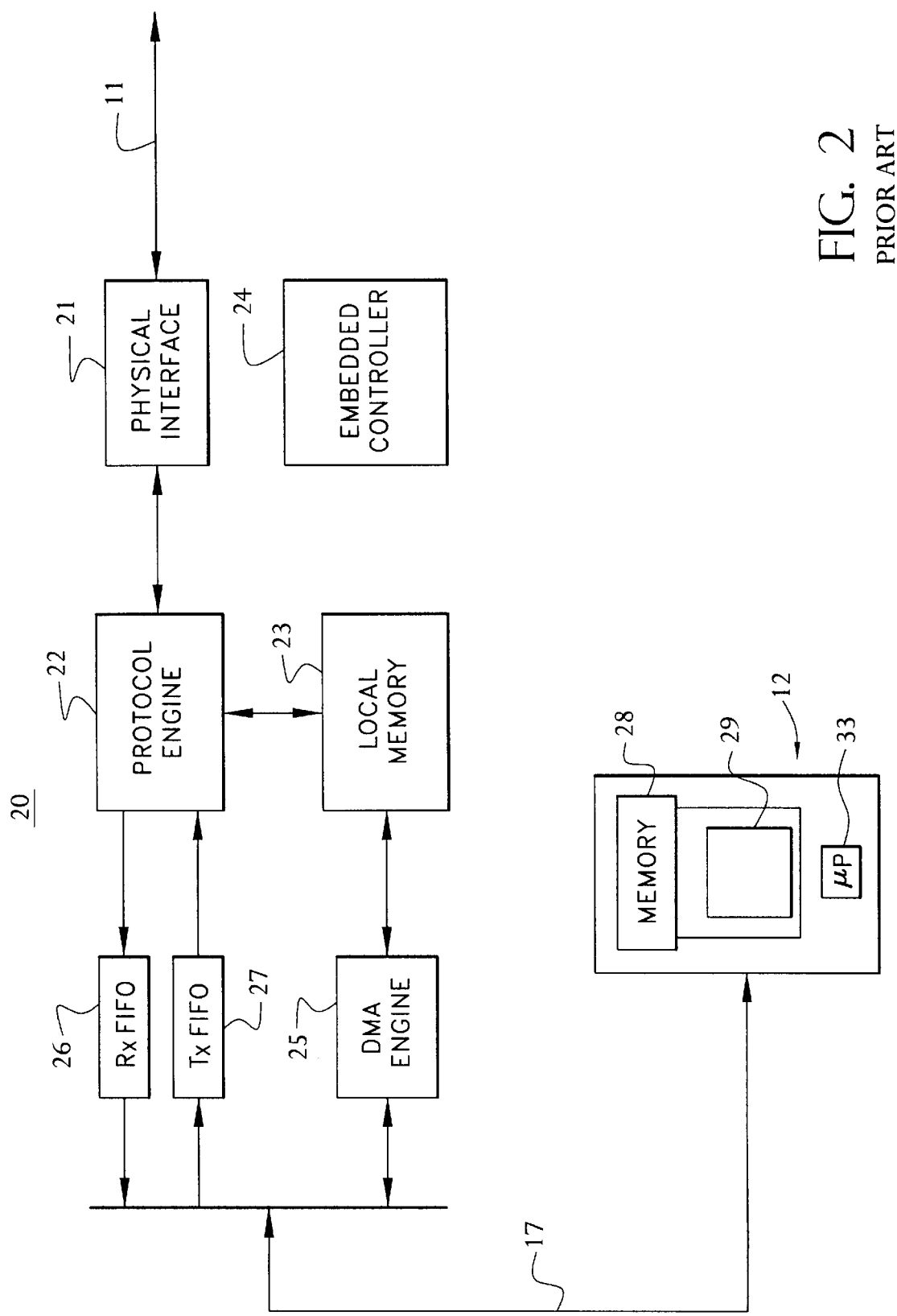
FIG. 2 is a block diagram of a conventional network interface.

Other hardware related to DMA functions can be eliminated on NIC 30 as compared to conventional NIC 20 of FIG. 2. Therefore, NIC 30 can be constructed without devices such as local memory 23 and embedded controller 24 for direct memory accessing. High speed bus 32 enables direct transfer of signals between computer node 12 and network 11, thereby eliminating or reducing a need for components that provide direct memory accessing.

As mentioned above, the high bandwidth and low latency of bus 32, which provide real time signal transfer between network 11 and computer nodes, such as node 12, enable network protocols to be processed by processor 33 of computer node 12. Therefore, NIC 30 can be constructed without a dedicated protocol engine, such as protocol engine 22 of conventional NIC 20. In fact, NIC 30 can be constructed without any hardware or software for protocol processing. Therefore, no local memory, such as local memory 23, or an embedded processor, such as embedded controller 24 of conventional NIC 20, need be included in NIC 30 for protocol processing. Protocols received over high speed bus 32 can be processed entirely by processor 33 of computer node 12. Significantly, current processors easily can handle the additional load of protocol processing in addition to other processing chores. As processor technology continues to rapidly advance, such protocol processing will be even less burdensome on processors.

Processor 33 of computer node 12 coupled to network 11 by NIC 30 also is preferably employed to arbitrate receipt and delivery of signals from and to network 11 and to reconstruct fragmented packets, where necessary.

NIC 30, coupled to computer node 12 through high speed bus 32 therefore can be constructed without on-board storage or processing devices, and can consist substantially exclusively of physical interface 31. Signal processing, such as protocol translation, can be performed by the processor 33 in computer node 12. No processors, such as embedded controller 24 and protocol engine 22 as found in conventional NICs, such as NIC 20, need be incorporated into NIC 30 of the invention. Furthermore, the high bandwidth and low latency of high speed bus 32 reduces or eliminates the need for on-board, interim storage of signals to or from the network, as is necessary in conventional NICs, which include, for example, local memory 23, and receive and transmit buffers 26 and 27 for that purpose. Since the low latency of bus 32 renders it substantially immediately accessible, and its high bandwidth enables transmission of digital signals at rate of around 800 Mbps, there is less or no need for the interim storage devices which typically are necessary in conventional NICs to hold network signals being received, for example until the bus is acquired for transmitting them to the computer node, or being transmitted, for example to enable an intelligible packet of signals to be accumulated for transmission over the network. Elimination of the receive and transmit buffers allows for elimination of DMA engine 25. Therefore, NIC 30 is a substantial improvement over conventional NICs, such as NIC 20, in that it can be manufactured at a substantially lower cost, since on-board processors and memory devices, including a protocol engine, an embedded controller, a local memory, receive and transmit buffers and a DMA engine, can be reduced and even excluded from the unit.

It should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A network interface, comprising:

(a) a physical interface, for coupling the network interface to a network, wherein: the physical interface is coupleable to the network and the network interface is coupleable to a computer node solely through a high-speed serial bus having a latency and a signal transmission rate sufficient to enable transmission of signals between the network and the computer node without prior interim storage of the signals in the network interface, wherein the network interface is external to the computer node.

2. The network interface of claim 1, wherein the computer node has a processor capable of processing network protocols and the signals may be transmitted between the network and the computer node without processing of the network protocols by a processor in the network interface.

3. The network interface of claim 2, wherein the processor in the computer node arbitrates signal receipt and transmission by the network interface.

4. The network interface of claim 1, wherein the signals may be transmitted between the network and the computer node without direct memory accessing by the network interface.

5. The network interface of claim 1, wherein the high-speed serial bus provides an isochronous bandwidth allocation for signal transfer.

6. The network interface of claim 5, further comprising:

(b) transmit and receive buffers, wherein the storage capacity of the buffers is minimized because of the isochronous bandwidth allocation.

7. The network interface of claim 1, wherein the high-speed serial bus provides an ability to directly access main memory of the computer node.

8. A network interface, comprising:

(a) means for physically interfacing to a network means and for coupling the network interface to the network means, wherein:
   the network interface is coupleable to a computer node means solely through means for high-speed serial signal transmission having a latency and a signal transmission rate sufficient to enable signal transmission between the network means and the computer node means without interim storage of the signals in means for storage on the network interface, wherein the network interface is external to the computer node means.

9. The network interface of claim 8, wherein the computer means has a means for processing capable of processing network protocols and the signals may be transmitted between the network means and the computer means without processing of the network protocols by a means for processing in the network interface.

10. The network interface of claim 9, wherein the means for processing in the computer means a arbitrates signal receipt and transmission by the network interface.

11. The network interface of claim 8, wherein the signals may be transmitted between the computer means and the network means without direct memory accessing by the network interface.

12. The network interface of claim 8, wherein the means for high-speed serial signal transmission provides an isochronous bandwidth allocation for signal transfer.

13. The network interface of claim 12, further comprising:

(b) transmit and receive storage means, wherein a capacity of the transmit and receive storage means is minimized because of the isochronous bandwidth allocation.

14. The network interface of claim 8, wherein the means for high-speed serial signal transmission provides an ability to directly access memory of the computer means.

15. A method for communicating between a computer node and a network comprising the steps of:

(a) coupling the computer node solely through a high-speed serial bus to an external network interface;

(b) coupling the network interface to the network; and (c) transmitting signals between the computer node and the network via the network interface, wherein the high-speed serial bus has a latency and a signal transmission rate sufficient to enable signal transmission between the network and the computer node without interim storage of the signals in a buffer on the network interface.

16. The method of claim 15, wherein the computer node has a processor capable of processing network protocols, further comprising the step of:

(d) processing of the network protocols by the processor without processing of the network protocols by the network interface.

17. The method of claim 16, further comprising the step of:

(e) arbitrating signal receipt and transmission by the network interface by the processor without arbitrating signal receipt and transmission by the network interface.

18. The method of claim 15, wherein step (c) comprises the step of transmitting the signals between the computer node and the network without direct memory accessing by the network interface.

19. The method of claim 15, wherein the high-speed serial bus provides an isochronous bandwidth allocation for signal transfer.

20. The method of claim 19, wherein the network interface has transmit and receive buffers and the capacity of the buffers is minimized because of the isochronous bandwidth allocation.

21. The method of claim 15, wherein the high-speed serial bus provides an ability to directly access main memory in the computer node.

* * * * *